United States Patent [19]

Denne

[11] Patent Number: 4,896,610

[45] Date of Patent: Jan. 30, 1990

[54] FLUID CUSHION DEVICE

[75] Inventor: Phillip M. R. Denne, Northbourne, England

[73] Assignee: Super X Limited, Southampton, Great Britain

[21] Appl. No.: 71,848

[22] Filed: Jul. 10, 1987

[30] Foreign Application Priority Data

Jul. 11, 1986 [GB] United Kingdom ............... 8616897

[51] Int. Cl.$^4$ ......................... B60V 1/16; B61D 15/00
[52] U.S. Cl. ..................................... 104/23.2; 104/85; 180/116; 180/127; 414/676
[58] Field of Search ............. 105/422; 104/23.1, 23.2, 104/84, 85, , 155; 180/127, 116; 414/676

[56] References Cited

U.S. PATENT DOCUMENTS

| | | |
|---|---|---|
| 3,094,223 | 6/1963 | Smith . |
| 3,273,727 | 9/1966 | Rogers et al. ................. 104/23.2 X |
| 3,381,627 | 5/1968 | Hart et al. ........................... 104/23.2 |
| 3,452,883 | 7/1969 | Watters ............................... 414/676 |
| 3,465,844 | 9/1969 | Page et al. ...................... 180/127 X |
| 3,561,558 | 2/1971 | Parkhouse ...................... 180/127 X |
| 3,592,285 | 7/1971 | Noble ................................. 180/124 |
| 3,685,607 | 8/1972 | Eglen ............................. 180/116 X |
| 3,698,506 | 10/1972 | Croix-Marie .................. 104/23.2 X |
| 3,820,467 | 6/1974 | Burdick ............................. 104/23.2 |
| 3,889,602 | 6/1975 | Barber ............................... 104/23.2 |
| 4,193,470 | 3/1980 | Logan ........................... 104/23.2 X |
| 4,371,309 | 2/1983 | Principe et al. .................... 414/676 |
| 4,569,410 | 2/1986 | Michels et al. ................ 180/127 X |

FOREIGN PATENT DOCUMENTS

| | | | |
|---|---|---|---|
| 787217 | 6/1968 | Canada ............................... 104/23.2 |
| 878818 | 10/1961 | United Kingdom ............... 104/23.2 |
| 1189442 | 4/1970 | United Kingdom . |
| 1343600 | 1/1974 | United Kingdom ................ 180/116 |

OTHER PUBLICATIONS

"Air-in-Floor Trailers" pamphlet by Clark Equipment, Brown Trailer Division, Sep. 1963.

Primary Examiner—Margaret A. Focarino
Assistant Examiner—Dean J. Kramer

[57] ABSTRACT

Fluid cushion equipment comprising a floor having valves supplied by a matrix of fluid supply lines and a fluid cushion platform. Positioning of the platform on or above the valves actively causes them to open to supply fluid beneath the platform which is trapped by flexible hollow tubular skirts. The platforms are driven in the described direction by one or more wheeled drives which are only in contact with the floor when thrust is required.

5 Claims, 6 Drawing Sheets

FLUID CUSHION DEVICE

The present invention relates to the movement of loads by means of a fluid cushion.

Low-friction movement systems using air cushions are known, such devices include hovercrafts which are an independent transport means having their own air cushion generation means, the air cushion taking the weight of the vehicle and the propulsion being by means of directionally-controlled propellers.

It is also known to move loads around by means of transporters having platforms suspended on air cushions. The air cushions are connected to compressed air lines. Compressed air is should be expelled beneath the platform to raise it onto an air cushion. The air cushion has the effect of raising the platform, as well as reducing any friction between the platform and the surface over which the load is to be transported.

The disadvantages of the above devices are that they both require the air cushion to be generated from the platform itself. In the case of the latter device, it must be physically connected to an external air supply line which passes compressed air to the platform to raise it from the floor. In certain situations, it is not possible to incorporate the air movement device within the platform nor to provide an air line for the purpose. To solve the air supply problem, the present invention provides passive air cushion vehicles which can be supported above a floor without having air movement means incorporated therein or being connected to an air supply by flexible hose.

GB961428 provides a friction-free floor for moving pallets around in an aircraft. GB1000636 describes a similar arrangement for pallets, the valves open by response to back pressure from the load platform. GB1237861 describes ball valves with no resilient bias opened by contact with the load. The ball valves remain open until the air flow is no longer restricted by the presence of the load. GB1137517 describes an air cushion vehicle which opens valves contained in a plenum floor by means of back pressure from the vehicle. Operation of valves by back pressure is difficult and not often successful. Other patent specifications of interest are GB772974; GB1026820; GB1164537; GB1236125; GB1280634, GB1297727; GB1402676 and GB1522708.

According to the present invention, there is provided fluid cushion equipment comprising a floor having a matrix of closed but openable fluid supply means, each having a supply system from a common fluid supply pipe, the fluid supply pipe being supplied from a fluid supply pump, a platform capable of opening one or more of the fluid supply means, the fluid supply means remaining closed until positively opened by the platform, the platform being capable of receiving and retaining fluid from the fluid supply means to provide a substantially frictionless fluid cushion between the platform and the floor, the fluid being retained by the platform by means of at least one hollow flexible skirt pressurised from the fluid supply means.

The floor should preferably be smooth and be covered on the upper surface with a hard layer of material such as a polyvinylchloride, melamine surface or steel plate. The underlying material of the floor should be sufficiently strengthened to enable the floor to be flat and preferably incorporates a steel underplate in order to provide structural rigidity. It is considered to be essential that the surface of the floor is smooth and airtight.

In one embodiment, the fluid is preferably air provided to the fluid supply means from below the floor by means of flexible hoses. Various types of air valves may be used, openable by the platform. The positioning of the air valves in the floor is such that there are close enough intervals to provide at least one air valve beneath the platform when it is positioned anywhere on the floor. It is preferred that the matrix of sealed air supply means has operable valves whereby a weight pressing on the upper surface of the valve will cause air to flow through the valve. When the weight is removed from the valve, then the valve will seal. A particularly preferred valve is a ball valve in a seat. Air pressure within the seat keeps the ball valve trapped preventing air from leaving the valve. Once sufficient weight is applied to the upper surface of the valve air passes via the sides of the valve seat. As soon as the weight is removed, the valve returns to the seat under pressure of air passing through the valve thereby closing it.

A preferred type of valve is a ball valve in which a ball is contained within an internal cylindrical bore of slightly greater diameter than the diameter of the ball. Within the internal closed bore is a hole of smaller diameter than the ball such that the ball abuts the hole and part of the arc of the ball extends through the hole above the surface level of the floor in which the valve is mounted. The ball should preferably be light enough to be borne easily on air within the ball housing, but have sufficient precision to close tightly against the internal circular hole within the closed bore.

Other alternative fluid supply means may be used to permit an air flow to be positively switched by the presence of a flotation platform above it.

For example, each section of the floor surface may be arranged to incorporate a device which is sensitive to the proximity of another device mounted on the moving platform, such sections may be in the form of tiles. When proximity is detected, an air supply means having an electrical valve may be operated to supply air to an array of orifices in the floor section or tile in that area.

Examples of proximity detection systems, which can operate electrical valves, are:

| | |
|---|---|
| A magnet on the platform: | Floor reed switch or Hall effect device detecting the magnet |
| Platform having a LF coil (10-200 kHz): | Floor ferrite antenna, detecting LF radiation |
| Platform having a microwatt RF antenna: | Floor ferrite antenna detecting RF radiation |
| Platform having an infra-red or light source: | Floor photodetector detecting such light |
| Platform having a retro-reflective surface: | Floor transmitter and photodetector |
| A building having a roof microwave light or infra-red source: | Floor photodetector operable when occluded. |
| A building having a roof ultrasound source: | Floor ultrasound receiver operable when occluded |
| Platform having an ultrasound source: | Floor having an ultrasound receiver. |

These alternative systems have the advantage that no mechanical contact is necessary between the platform and the air valve, so that the motion is smoother with less chance of damage to the valves. The cost of such devices is greater.

The platform is preferably in the form of a disc, although this is not essential. The platform can be any shape providing any weight placed on the platform has its center of gravity at the center of pressure of the platform. However, in practice, this is very difficult to do and the platform has some kind of enclosure means such as a flexible skirt surrounding the edge in order to trap air beneath the disc. As the platform passes over the air supply means, the platform can operate the valve to cause air to flow through the valve to form a cushion beneath the platform. The skirt expands raising the platform until the weight of the load per unit area and pressure of the air are equal allowing air to escape from beneath the skirt. This provides a thin air cushion to lubricate movement of the load.

The skirt is in the form of a hollow flexible skirt, and is a low pressure pneumatic skirt which can also take the weight of the platform once the platform is no longer supported by the air cushion. Other forms of skirt means are also possible as is described below.

The present invention will be further described with reference to the accompanying drawings in which.

Figure 1:
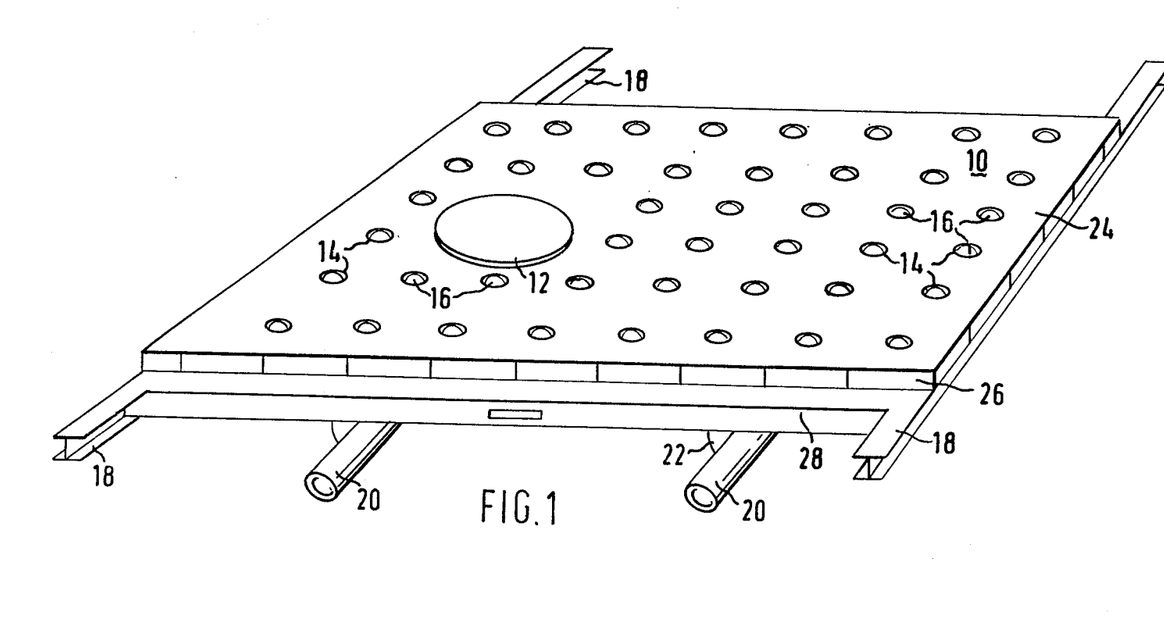
FIG. 1 is a partial section of the floor of the present invention showing the fluid means.

Referring to FIG. 1, a partial section of the floor 10 of the present invention is shown having positioned thereon a platform 12. Seated within the floor 10 are fluid supply means 14 which are preferably air valves having ball seal means 16 which are further described in FIG. 2. The floor is generally mounted on joists 18, which are preferably steel joists, to provide structural rigidity to the floor 10. Beneath the floor are fluid supply pipes 20 which are generally air supply pipes having subsidiary smaller diameter air supply pipes 22 extending to each of the valves 14. The floor generally has an upper smooth surface 24 made of polyvinylchloride or melamine tiles, a wooden core 26 and a steel plate 28 which forms an underplate to the flooring, once again to provide structural rigidity. Whilst this construction of the floor is a preferred construction, the main essentials of the floor surface are that it be smooth, and airtight. Thus, any construction which can provide these properties will be satisfactory for the present invention including a steel surface.

Figure 2:
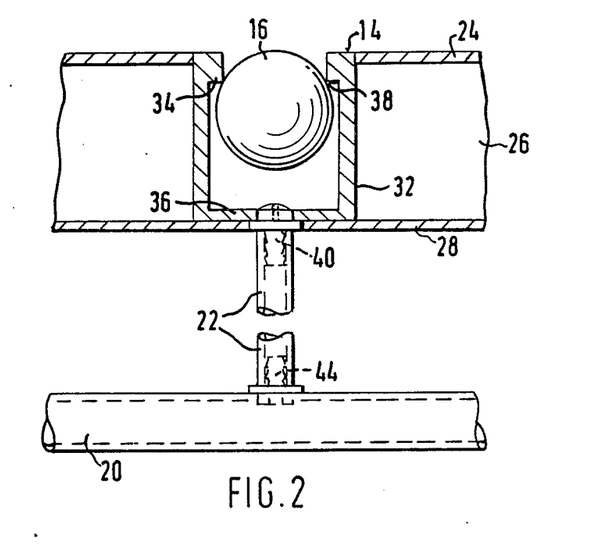
FIG. 2 shows the fluid supply means in cross section.
Figure 3:
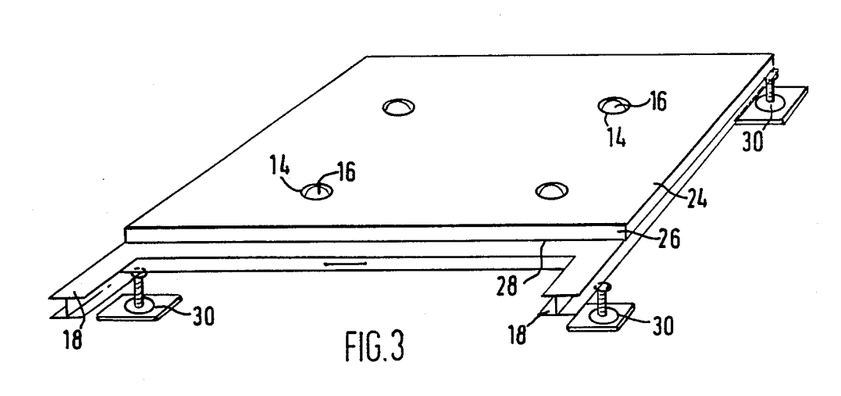
FIG. 3 is a partial section of one floor.

A particular form of floor construction may be formed of a number of standard wooden floor tiles approximately 38mm thick, 600mm square, covered on the upper surface 24 with a hard layer of PVC or melamine and on the lower surface by a steel plate 28. A partial section of one floor tile is shown in FIG. 3. Each floor tile is placed on joists 18 and at the corner of each tile beneath the joists 18 are jacks 30 which can be used to adjust the floor to enable it to be uniformly flat in all directions to a close degree of tolerance. The joints between the tiles are sealed to prevent air escaping directly downwards from beneath the air cushion system. The level of the floor can be detected by electronic level means (not shown). Each floor tile is drilled to accommodate ball valves with a density of 4 or 5 per tile. As shown in FIG. 2, a floor tile is drilled such that the valve seating 32 is closely fitted within the drilled hole and rests on the steel underplate 28. It is preferred that approximately 4 or 5 ball valves 14 are provided per tile.

A preferred form of fluid supply means will now be described with reference to FIG. 2. The fluid supply means 14 comprises a valve seating 32 in the form of a parallel sided circular tube having a cap 34 and a lower cap 36. Contained within the valve seating is a ball 16 which should be precision ground so that it is substantially spherical. The diameter of the ball 16 is slightly less than the diameter of the seating 32. The upper cap has drilled therein a hole which can be precision drilled to have clean edges which ensure that the ball contacts the cap on a line which is substantially circular. The diameter the the upper cap edges should be slightly smaller than the diameter of the ball and chosen such that an arc of the ball extends through the upper cap edges 38 to be positioned protruding above of the surface 24 of the floor when air pressure is applied to the valve.

As already indicated the valve ball 16 should be spherical in order to mate with the upper cap edges 38 when air pressure is applied. Drilled through the lower cap 36 and mounted in the steel plate 28 is a nipple 40 having attached thereto a plastic pipe 22 which extends to a supply pipe 20. The nipple has the additional function of locating the valve seating 32 within the wooden core of the flooring 26 and attached firmly to the steel plate 28. Low pressure air can be supplied from the supply pipe 20 which may itself be of plastic or other suitable material through the smaller diameter supply pipe 22 which is preferably of flexible material such as PVC to the nipple 40. Thus, when the supply pipe 20 is pressurised, air is supplied to the valve seating 32 via the supply pipe 22. The ball valve 16 is preferably made of a light plastic material and consequently the air pressure from the supply pipe 22 causes the valve to seat within the upper end cap 34. The spherical ball valve and the precision drilled upper cap edges 38 make a circular line contact which is sufficient to seal the valve. As already indicated, the upper portion of the ball 16 protrudes above the surface 24 such that any planar surface resting on the surface 24 will push the ball 16 downwards, break the line contact with the upper cap edges 38 and cause air to flow through the valve. By way of example, the fluid supply means 14 has a valve cylinder 32 of slightly greater than 25mm in diameter with the diameter of the upper cap edges being 20mm in diameter. The ball 16 has a diameter of 25mm and approximately 3 to 5mm of the ball protrudes above the surface 24 of the floor. The above dimensions are merely given as examples and are not critical. In the absence of air pressure the ball 16 rests on the upper surface of the nipple 40 so that the surface of the ball 16 is lower than the projection of the smooth upper surface 24 of the floor tile in which the valve seating 32 is designed to be flush-mounted.

When air is supplied via the pipe 20 and smaller diameter pipes 22, the air rushing past the ball 16 escapes through the upper cap 34 until sufficient air friction is built up to carry the weight of the ball 16 upwards until the spherical surface of the ball 16 seats into the circular upper cap edges 38 causing the air flow to cease and jamming the ball into the hole with sufficient upward force. The upper force may be, for example, 2 kilograms. If an object weighing more than 2 kilograms rests on the upper surface of the ball 16, the circular line seal will be broken and air will rapidly escape from the ball valve. When the seal is broken, anything moving across the surface of the ball 16 rolls upon the ball which in turn rolls on an air bearing consisting of air beneath the ball 16 and passing the ball along the inner walls of the valve seating 32.

The base of the valve via nipple 40 is connected to a large diameter fluid supply means and a length of plastic pipe 22 which is preferably about half a meter long to allow both the ball valve and floor tiles to be serviced from time to time. The length of the flexible pipe 22 allows a floor tile to be raised whilst still connected to the supply pipe 20 beneath the flooring. It also allows valves to be changed and pipe connections to be inspected without total disconnection of the valve unit 14.

Figure 4:
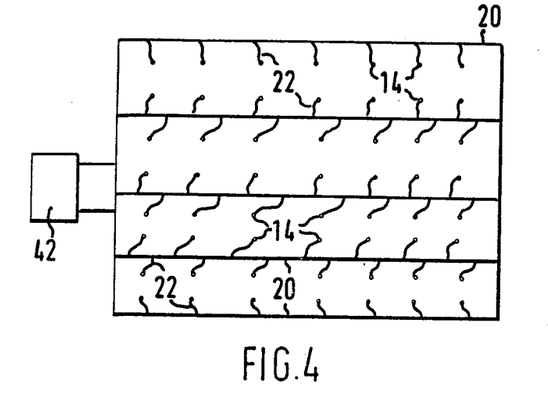
FIG. 4 is an example of the air supply means to the air supply valves.

As shown in FIG. 4 the matrix of valves 14 is supplied with fluid, such as air, through pipes 20 and small diameter pipes 22 from a pump 42. The pneumatic impedance of the plastic pipe 22 and the pipe nipple 40 attaching the valve seating 32 into the floor 10 as well as the pneumatic impedance of the nipple 44 (as shown in FIG. 2) attaching the pipe 22 to the pipeline 20 is important. The impedance of these items together with the clearance of the precision plastic ball 16 within the valve seating 32 is arranged to limit the airflow to a sufficient level per ball valve. Thus, if a platform 12 is designed to open 5 valves at any one time in any position on the floor by reason of the pattern of the ball valves 14, the platform 12 will receive a sufficient controlled air supply which is equal from each ball valve. In addition the design of the pipe 20 allows a large number of the individual air supply valves to be connected to a low impedance common source of air supply. The volume of air leaving each valve is independent of the action of nearby valves and is substantially independent of back pressure beneath any platform 12 placed upon the valve on the floor 10, i.e. the pneumatic impedances are arranged so that air is not diverted to other valves by minor variations in air cushion pressure beneath the load platform.

Figure 5A:
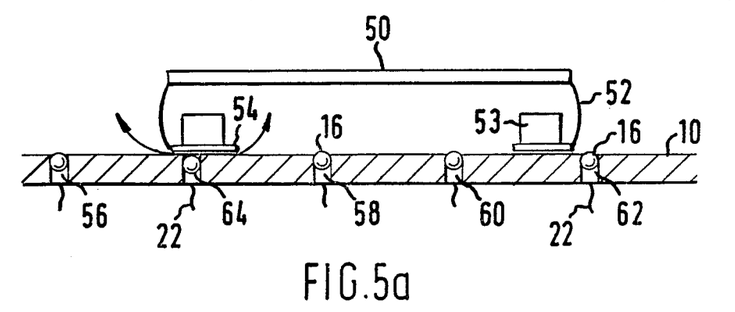
FIGS. 5a and 5b shows a first embodiment of the air cushion platform in an expanded and collapsed form.
Figure 5B:
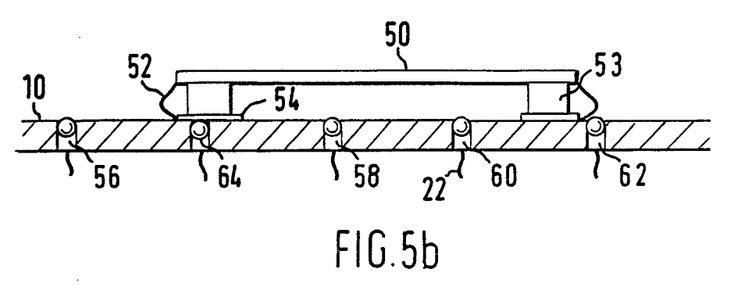

FIGS. 5a and 5b show in more detail the platform which is supported above the floor by means of air pressure.

In the simplest form this may be a simple flat plate of any shape but preferably circular. The weight of the plate which depresses the ball valve 16 causes air to flow through the valve and form a cushion beneath the plate. The plate is preferably designed such that it covers at least 4 or 5 ball valves in the surface of the floor 10. A thin cushion of air causes the plate to float and it may be easily moved in any direction. The disadvantage of a simple flat disc is that if the center of gravity of the load does not coincide with the center of pressure of the plate, capsizing can occur with release of the cushion of air from one area such that the lower surface of the disc contacts the floor.

In FIGS. 5a and 5b, a platform in the form of a disc 50 having a flexible skirt 52 is shown. Attached to the base of the flexible skirt 52 is a lower base 54 which generally conforms to the shape of the disc 50 but has a central opening. With the valve 16 primed, i.e. under air pressure, such that the ball 16 is sealing the upper cap edges 38 to prevent escape of air (see FIG. 2) no air can pass. In FIG. 5a ball valves 56,58, 60,62 are shown in the closed position, whereas ball valve 64 is in contact with the lower base 54 causing the ball 16 to be depressed into the valve seat to allow air to escape from the valve in the directions shown by the arrows, i.e. underneath the base 54 and within the skirt 52, as well as to escape outwardly from the skirt. The air flow from one or more ball valves is sufficient to inflate the skirt 52 and raise the platform 50 from its rest position to a position wherein the weight of the platform plus its load counteracts the air pressure and air flows beneath the skirt to form an air cushion. The thin layer of air which escapes underneath the base 54 provides a lubricating film which reduces the resistance between the floor 10 and the platform 50.

The platform system shown in FIG. 5a also can cause a problem. When the center of mass of the item which is supported by the platform 50 does not coincide with the center of area of platform 50 there is a tilting moment which causes one side of the skirt 52 to be depressed more than the opposite side. When the periphery of the skirt is attached to the large hard lower base 54, as shown in FIG. 5b, the lower base touches the surface of the floor 10 resulting in significantly more friction than elsewhere on the disc 50. This friction provides a braking force which causes the periphery of the disc 50 on the opposite side of the disc to rise allowing escape of air, consequently reducing the lift. Thus, the base 54 may stop the disc preventing further floating action on the surface of the floor 10 until the disc reinflates via the ball valves 14.

FIG. 5b shows the disc of FIG. 5a in a rest position supported by the landing pad 53 which interposes between the lower surface of the disc 50 and the lower base 54. The landing pad 53 prevents the disc 50 and skirt 52 from collapsing completely. The landing pad 53 is preferably made of resilient material such as a rubber or foam in order to absorb the weight of the disc 50 and any load thereon without placing a severe load on the skirt 52.

Figure 6:
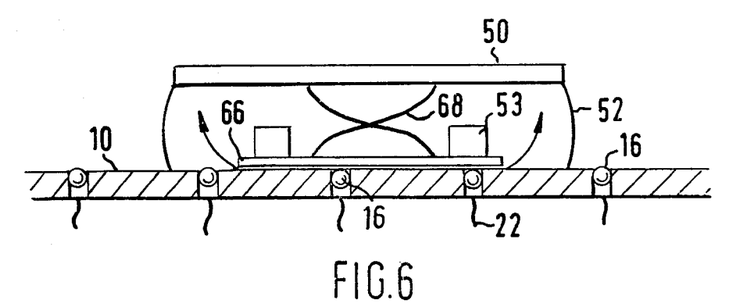
FIG. 6 shows a second embodiment in cross-section of the air cushion platform in an expanded form.

FIG. 6 shows an alternative to the disc of FIG. 5. In FIG. 6 disc 50 has a skirt 52 and a central valve operating plate 66 suspended from the lower surface of the disc 50 by spring arms 68. The spring arms 68 support the valve operating plate 66. In operation, the air valves 16 are primed by passing air through the air supply pipes 20 and smaller diameter pipes 22 to raise the balls to seal the ball 16 against the upper cap edges 38. The weight of the valve operating plate 66 depresses the ball and allows air to escape in the direction of the arrows shown, which causes the platform to rise and the skirt to inflate. The air passes beneath the disc operating plate 66 such that there is no friction and the air then passes beneath the skirt 52. Thus, the disc 50 can "float" over the floor 10.

Figure 7:
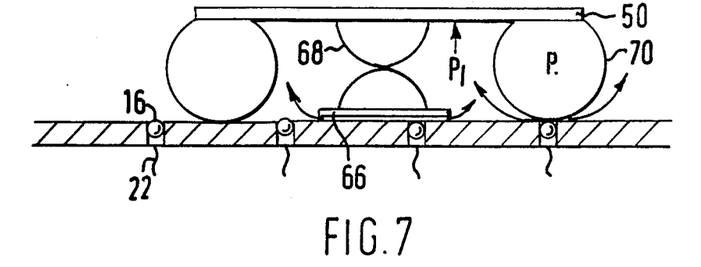
FIG. 7 shows a third embodiment of an air cushion platform in cross-section.

A further embodiment of the present invention is shown in FIG. 7, whereby a platform 50 is mounted on an inflated torus 70. This may be in the form of a softly inflated rubber or synthetic rubber tube. As in FIG. 6, the platform 50 has a valve operating plate 66 to open the valves to allow air from the valves to escape within the torus and raise the disc 50. If the pressure from the air supply to the system reaches a value equivalent to the load times the area of the disc 50, then the seal formed by the toroidal skirt 70 is broken and air can escape from underneath the skirt again providing a lubricating film for the platform to move upon.

Figure 8:
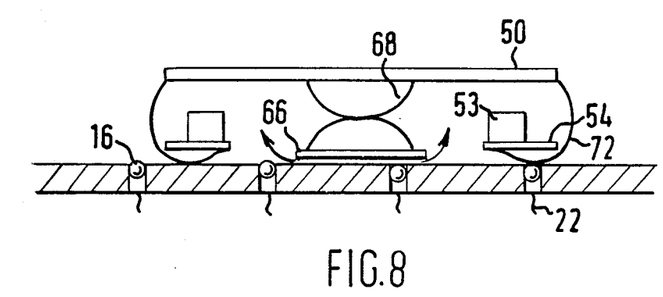
FIG. 8 shows a fourth embodiment of the air cushion platform.

FIG. 8 shows a further platform 50 having a skirt type flexible seal which extends from the base of the disc 50 to the lower base 54 beneath the lower base 54 and attaches to the internal circumference of the base. The landing pad 53 is also supplied as is the valve operating plate 66 attached to the base of the disc 50 by spring arms 68. The flexible type skirt 72 becomes inflated by the pressure under the disc forming a thin compliant seal with the same properties as the torus as shown in FIG. 7 without having the disadvantage of a separately pressurised toroid beneath the disc 50. Once again a landing pad 53 is provided when the air pressure is removed from the system causing the disc 50 to collapse. The landing pads 53 keep the discs stable when no air pressure is applied and once sufficient air pressure enters the inner portion within the disc sealed by the flexible skirt type seal 72, the disc 50 rises from the landing pads 53.

In operation, the air is supplied through supply pipes 20 and 22 to the valve 14. By placing a disc 50 in one of the forms shown onto the surface, the valves are opened, causing air pressure to build up until it is able to escape from beneath the skirt or toroid forming a very thin air cushion having low friction properties. Providing the floor is flat and horizontal, the pad 50 will stay in one place. Very light motive power, e.g. a push, will cause the disc 50 to float across the floor in the direction of the push.

Although pressure operated ball valves have been described in the particular embodiments, also previously indicated electrical valves operable by proximity detection may be used. Such alternative supply means have further advantages which relate to the minimum size of platforms used in the system. In the case of the ball valve systems, the ball-opening means, i.e. the valve operating plate must be larger than the minimum distance between ball valves, so that if the size of the platform is to be reduced to half, the number of ball valves per unit area must be multiplied by four, which is costly. However, if the proximity system is so arranged that air is released from many small holes over any floor tile by the operation of one controlled valve, then the size of the platform or flotation unit may be varied at will, some of the air valves supplying the platform causing it to float whilst others merely release air. The size of the floor is not critical and is only limited by the air supply means beneath the floor. For very large floor areas this may be divided up into several different air supply cells as required, such that, for example 1000 or more air valves may be supplied from one air supply cell.

A platform 12 has been described which in general is passive. To cause it to move in any particular direction, it may have some propulsion. As shown in FIG. 1, a load may be placed on platform 12 positioned on the floor 10 having activated air systems such that the platform floats above the surface of the floor as has been previously described. The load carried by the platform 12 can be a passive load to be moved from point to another. In the alternative, the platform 12 could carry, for example, a person to enable them to be transported across the floor either in a sitting or standing position. A sitting position is preferred as the occupant will change the center of gravity of the platform 12 to a lesser extent and therefore, the stability to a lesser extent. For maneuvering, the platform 12 may be remotely controlled or be controlled by the occupant.

Figure 9:
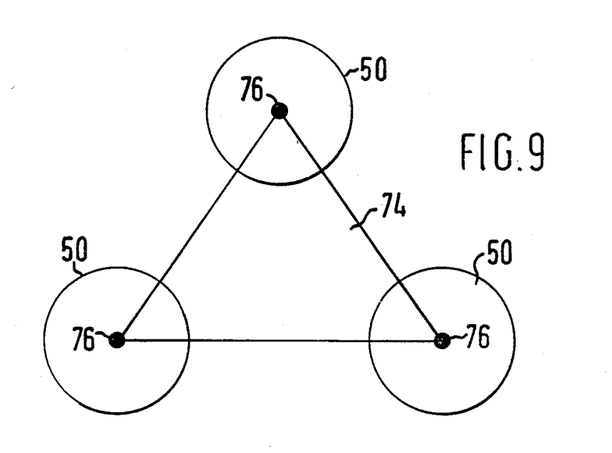
FIG. 9 shows a combination of platforms linked together.

As shown in FIG. 9 a combination of the discs 50 may be used, for example, in the form of a triangle, i.e. three discs are linked together such that each platform 50 is an independent supporting means. Depending on the load to be carried, any number of discs 50 may be combined together The interconnecting platform 74 between the discs 50 is generally connected by universal joints 76, such that each of the discs 50 may move independently, but in practice this is not found to be essential. Although 3 discs have been shown, it is clear that 4 or 5 discs may be connected in like manner such that the interconnecting may be square or pentagonal in shape. The great advantage is that each disc acts as an independent hover module and the force on each individual module is always supplied at the center of area and no one module has any tendency to instability. The disadvantage of providing multiple discs as independent hover modules is that more components are required and therefore costs are increased. In the case of three toroidal pads in a triangular arrangement without universal joints, the platform remains stable so long as the center of gravity of the load falls within the triangle joining the center of each toroid. This provides exceptional stability at low cost. Of course, it should be understood that the size of each hover module in the form of discs 50 must be sufficient such that each module is assured of an adequate air supply to cause it to form an air cushion. It might be thought that the modules could be interconnected by piping so that air could be transferred from one to another. However, this does have the disadvantage that the demand for high pressure in any one module having a higher load upon it would cause pressure to be relieved in another module such that the air cushion will collapse. The modules preferably should be independent.

Figure 10:
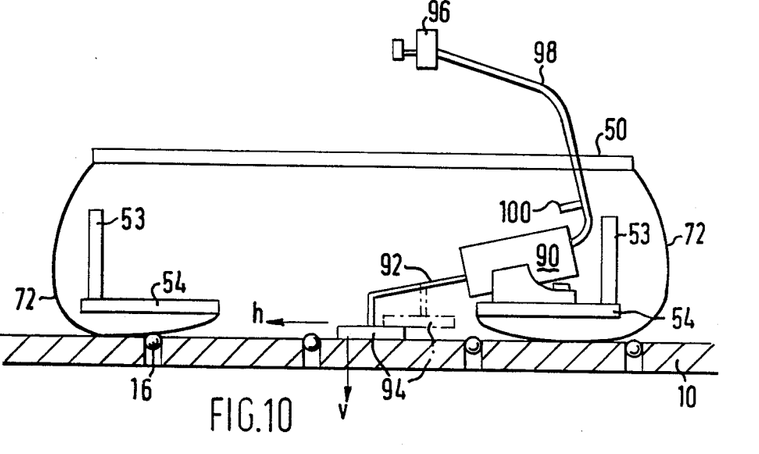
FIG. 10 shows a modification of the embodiment of FIG. 8 having propulsion means activated from the platform.

FIG. 10 shows a variation of the embodiment shown in FIG. 8 having a platform 50, a flexible type skirt 72 and extended landing pads 53. A thrusting device having a cylinder 90 is mounted on the lower base 54 comprising a spring loaded thruster unit in the form of an internal piston connected to an arm 92 having a pad attached thereto 94. The pad 94 preferably has a rubber undersurface to ensure good contact and non-slip properties with the floor 10. When the arm 92 is extended from its rest position shown by dotted lines to the contact position 94, it provides the vector thrust both in the horizontal and vertical directions shown by the two arrows v and h, with a resultant sideways thrust causing the platform 50 to be propelled across the floor. The arm 92 can be extended by means of a hand operated piston diaphragm unit 96 by a flexible air hose 98. After operation, the pad 94 retracts because of the spring loading of the piston within the cylinder 90, drawing replacement air through a non-return valve 100. A thrusting device can be positioned on either side of the disc 50 such that the person sitting on the disc 50 may operate both the left and right hand thruster unit to provide steerage and movement of the disc 50 when it is in its floating mode.

Figure 11A:
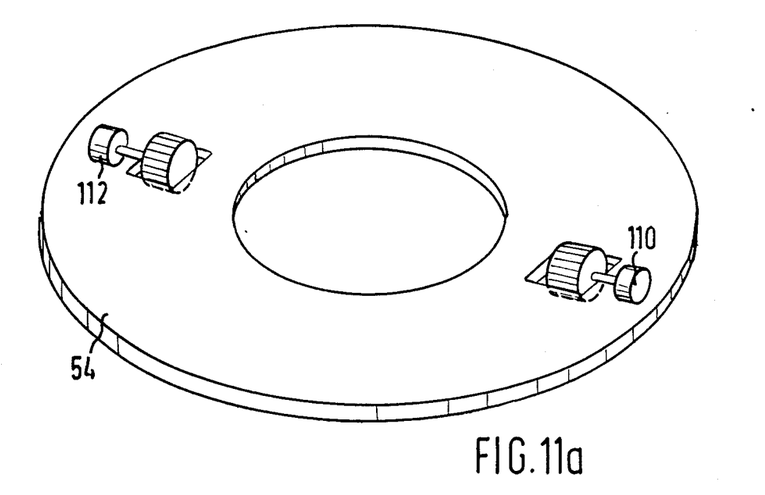
FIGS. 11a and 11b show a further embodiment of a thruster mechanism for the platform of the present invention.
Figure 11B:
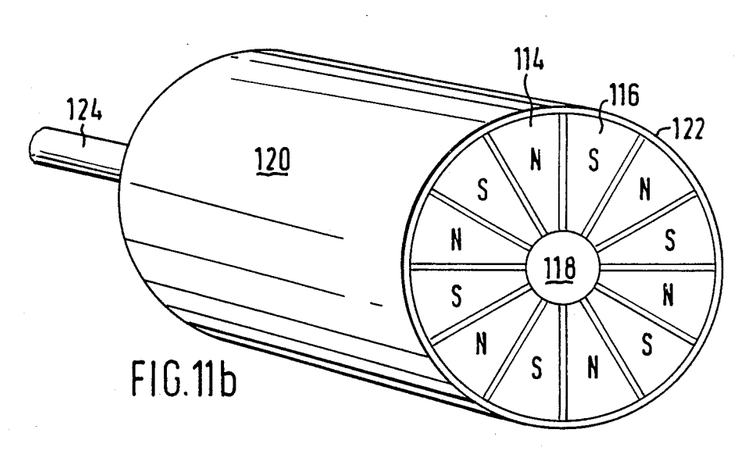

An alternative propulsion mechanism will now be described with reference to FIG. 11. In platform 12, lower base 54 of, for example, FIG. 5a, has mounted thereon two electric motors 110 and 112 which drive segmented cylindrical magnetic material of face magnetised material alternately magnetised north and south and generally designated 114 and 116, respectively in FIG. 11b. Each of the sectors is mounted on a magnetic core 118. Each segment is a faced magnetised bar magnet wherein the face is magnetised as designated in FIG. 11b. The magnetic wheel 120 is mounted in a plastic tube 122 as the tendency of the segment would be to expand radially because of the mutual repulsion between the faces of the segments. The magnetic wheel is driven by a shaft 124, attached to the electric motors 110 and 112, respectively. By rotating the magnetic wheels at, for example, 150 rpm, with a 1mm gap above a steel floor surface 10 using a 50mm diameter wheel, a horizontal thrust of approximately 1 kilogram can be provided causing the disc 50 of, for example FIG. 5a, to move in the direction of the thrust. Two magnetic wheels can be positioned either side and within the platform 10 such that when the rotation of the magnetic wheel occurs thrust is provided on either or both sides of the platform 10 to provide forward propulsion or steerage to the right or left. The operation of the magnetic wheels requires a steel surfaced floor 10 in order to interact with the moving magnetic field generated by the wheel. To operate the electric motor a battery (not shown) must be carried on the hover module or platform 12. The battery can be a re-chargeable type of sufficient size to allow the operation of the electric motors.

Because the mass of the loaded platform is significant (approximately 100 kg) the energy required to accelerate it to an acceptable velocity (say, 1 meter/second) is not small. This means that the propulsion mechanism has to apply its force continuously over a distance which cannot be short; the required effect is a gentle acceleration lasting several seconds rather than a short violent impulse. A cylinder thrust device must therefore have a long stroke which increases cost and makes manual operation of the diaphragm actuator impracticable in most cases.

As an alternative to the battery powered electric motor, magnetic wheel system previously described, a conventional tired wheel can be employed. The tired wheel can be brought into contact with the ground when required by means of a Bowden cable and hand-operated grip control for each motor. A reverse preselector switch is used for each motor to provide a high degree of maneuverability. The motors are switched on just before the wheels make contact with the floor by means of a microswitch system to conserve battery power. Releasing the grip control raises the motor and switches off the motor.

Figure 12:
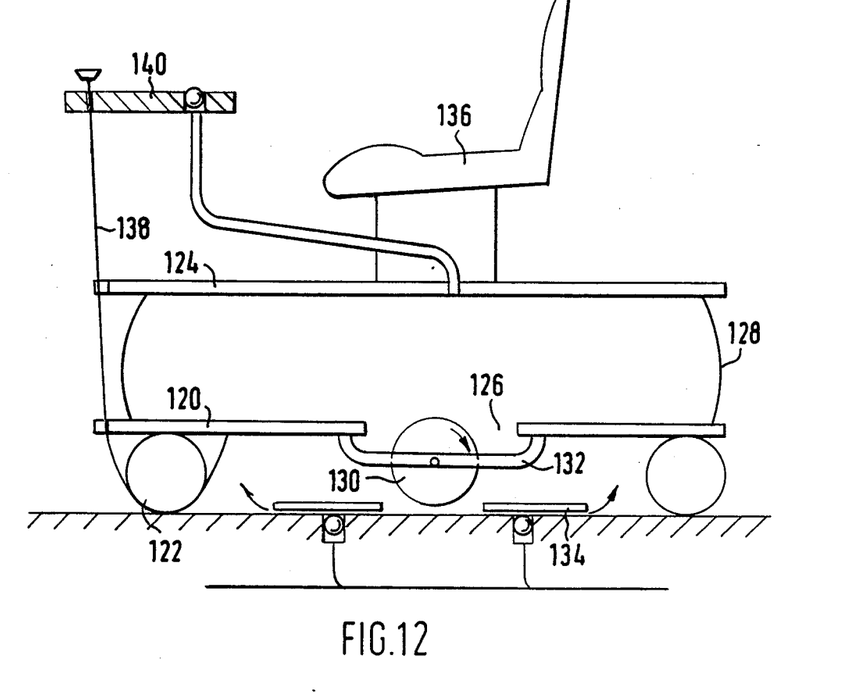
FIG. 12 shows a diagrammatic cross section of a further embodiment of the present invention.
Figure 13:
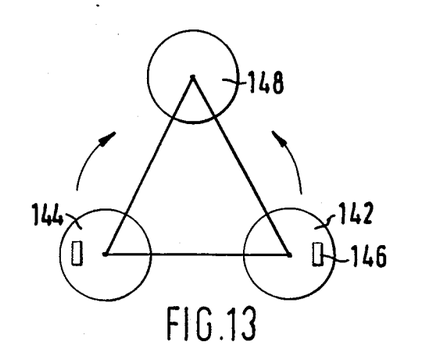
FIG. 13 shows a plan view of an alternative embodiment of that described in FIG. 12.

Referring to FIGS. 12 and 13, an alternative embodiment of the platform is shown. Platform 120 in the form of a disc having a hollow flexible skirt 122 is shown. The hollow flexible skirt 122 may be in the form of a pneumatic tube containing air at substantially the same pressure as is released from the air floor valves. A further disc 124 may be mounted above the disc 120. The disc 120 has a central opening 126 which allows the air to pass from beneath the first disc to a volume beneath the second disc. The disc 124 is connected to the disc 120 by sealed flexible walls 128. A motor drive wheel 130 is mounted on a bracket 132. The motor drive wheel 130 has a drive motor and gear box, not shown, causing the motor drive wheel 130 to rotate in the direction shown by the arrow. This is not normally in contact with the floor but can lower to a driving position as described below. The lower base 134 causes the air valve to open in a similar manner to that described in relation to FIGS. 5a and 5b. Air inflates the volume beneath the volume between the lower disc 120, some air escaping to the volume between the discs causing the upper disc to float above the lower disc.

The second air cushion is mounted beneath a seat 136 and is intended to provide the occupant of the seat with a soft ride to lift the occupant into the air a distance of approximately 250mm, although this may be varied as required. The psychological effect of this to the occupant is that there is a much enhanced sensation of being supported on a cushion of air giving a enhanced impression of being on a personal hovercraft. The platform with the double disc causes the occupant to rise on initial inflation to a much greater extent than a single disc.

The drive system can be controlled deflating or squashing the flexible tubular skirt 122 for example by means of a cord 138 which when pulled from a control panel 140 causes the skirt to release air and partially deflate the platform, such that the drive wheel 130, normally not in contact with the floor, comes in contact with the floor creating a thrust in a particular direction. Releasing the cord causes the platform to re-inflate raising the drive wheel 130 off the floor and stopping any drive motion from the drive wheel 130.

An alternative method of spilling air from the platform to allow the drive wheel 130 to come in contact with the floor is by means of an air valve which can be pushed down by the occupants finger causing release of the air in the platform enabling the drive wheel 130 to touch the floor. Both air release devices are shown in FIG. 12 and can be used either separately or in conjunction with one another.

The drive wheel 130 may be contained at or towards the edge of a platform in single form such that there may be drive wheels on opposite sides of the platform to cause the platform to turn left or right. Alternatively, in the format shown in FIG. 13, where three platforms are arranged in a triangular arrangement (similar to that of FIG. 9). A single drive wheel may be contained on platform 142 and platform 144, both platforms comprising the rearward platforms of the trio. Causing the air to be expelled from platform 142, for example, allows the drive wheel 146 to come in contact with the floor with the result that the vehicle, comprising the three platforms 144, 142 and 148, turns to the left. Similar release of air from platform 144 will cause the vehicle to turn to the right as shown by the arrows.

In a further embodiment, the motors driving the drive wheels may be reversible by means of a rocker switch or one of two push buttons located on the control panel 140.

An advantage of the secondary air cushion arrangement is that minor differences which arise from one part of the floor to another and which change the air pressure in the cushion system are perceived by the occupant as a peculiar unpredictability of the riding height. This increases the novel sensation of the device and therefore its entertainment value.

The present invention has application in moving loads over flat areas. The platforms are independent of air supply means connected by pipe to the platform such that the operational area can be greater than currently available load carrying systems. The present invention has significant advantages in this respect. In addition, the present invention has advantages when compared to conventional hovercraft which need to carry their own motive power to provide the air cushion, thus reducing the load carrying capacity of a given platform size.

The present invention has a particular application in providing a floating sensation to an occupant sitting on the platform 12. Thus, a seat may be provided on the platform 12 having arms with control mechanisms to operate the propulsion devices described in FIGS. 10 and 11 capable of thrusting and steering the platform 12. A person may sit in the seat on the platform 12 and air is passed through the pipes 20 and smaller pipes 22 to the valves 14. The weight of the platform 12 on a predetermined number of the valves will cause these to open, allow air to within the skirt to cause the platform to rise from its rest position, for example as shown in FIG. 5b, to a position where the skirt is extended and a cushion of air passes beneath the skirt. As the platform 12 rises the room containing the floor is darkened and possibly the floor is tilted to provide some initial motion to the floating platform 50. The occupant of the platform 50 can then control the direction of movement of the unit as desired while experiencing the feeling of drifting in space. The room ceiling may have a planetarium effect to entrance the realization of space. Hover vehicles can be constructed to suggest any version of a "space drift" theme, such as miniature flying saucers, rocket cars and so on and the vehicles may have more than one seat. It is possible to construct unusual forms of helter skelter, roller coaster or dry water chute for amusement purposes by employing the techniques described herein in this application but in which motion is induced and controlled by the use of flooring which is flat but deliberately sloped in any required direction. The floor slope may be varied by rams or jacks, as previously described.

I claim:

1. A cushion system comprising:
   floor means defining an outer surface and including internal fluid passageways and a matrix of valve chambers communicating with said passageways, said valve chambers having openings to said outer surface of said floor means,
   valve elements moveably mounted in said valve chambers, a tubular nipple having one end centered inside said valve chamber for supporting an associated valve element in a valve open position, said valve elements being spherical and said valve chambers being cylindrical for loosely receiving said spherical valve elements, each said valve opening defined by an annular seating surface adjacent an end of said valve chamber opposite said end of said valve chamber fitted with said nipple, each said valve element including a portion projecting through said valve opening beyond said floor outer surface when said valve element is in its closed position, said projecting spherical surface portion providing a low friction contact,
   platform means including a flexible inflatable torus shaped skirt, said torus defining internal cavity, said platform means further defining a plenum chamber inside said torus in cooperation with a region of said floor outer surface, and said region including at least one valve chamber opening,
   a plate suspended inside said platform defined plenum chamber, and means normally biasing said plate toward said floor outer surface for engaging at least one valve element projecting portion in order to move the valve element toward an open position so that fluid from the valve chamber passes into the plenum chamber, said plate biasing means exerting a form on said valve element sufficient to overcome said fluid pressure on said valve element, said toroidial shaped internal cavity containing fluid at substantially the same fluid pressure as that provided to said plenum chamber from said valve chambers,
   said platform comprising at least individual disc shaped elements connected to one another by a frame such that three discs are provided adjacent the vertices of said triangular frame,
   and drive wheels adapted to contact said floor outer surface.

2. The system according to claim 1 wherein said drive wheels so contact said floor surface only upon partial deflation of said toroidial skirt.

3. The system according to claim 2 further characterized by means for manually releasing fluid pressure from said toroidial shaped flexible skirt in a controlled manner.

4. The system according to claim 3 further characterized by means for driving said drive wheels in one or an opposite direction, and means for controlling said reversible drive means.

5. The system according to claim 4 further characterized by a control panel accessible to the occupant on said frame and containing rocker switch means for controlling said reversible motors, and containing the means for manually releasing air from said toroidial shaped flexible skirt.

* * * * *